April 25, 1933.  C. L. HOWSE  1,905,172
LIQUID GAUGE
Filed July 13, 1927   2 Sheets-Sheet 2

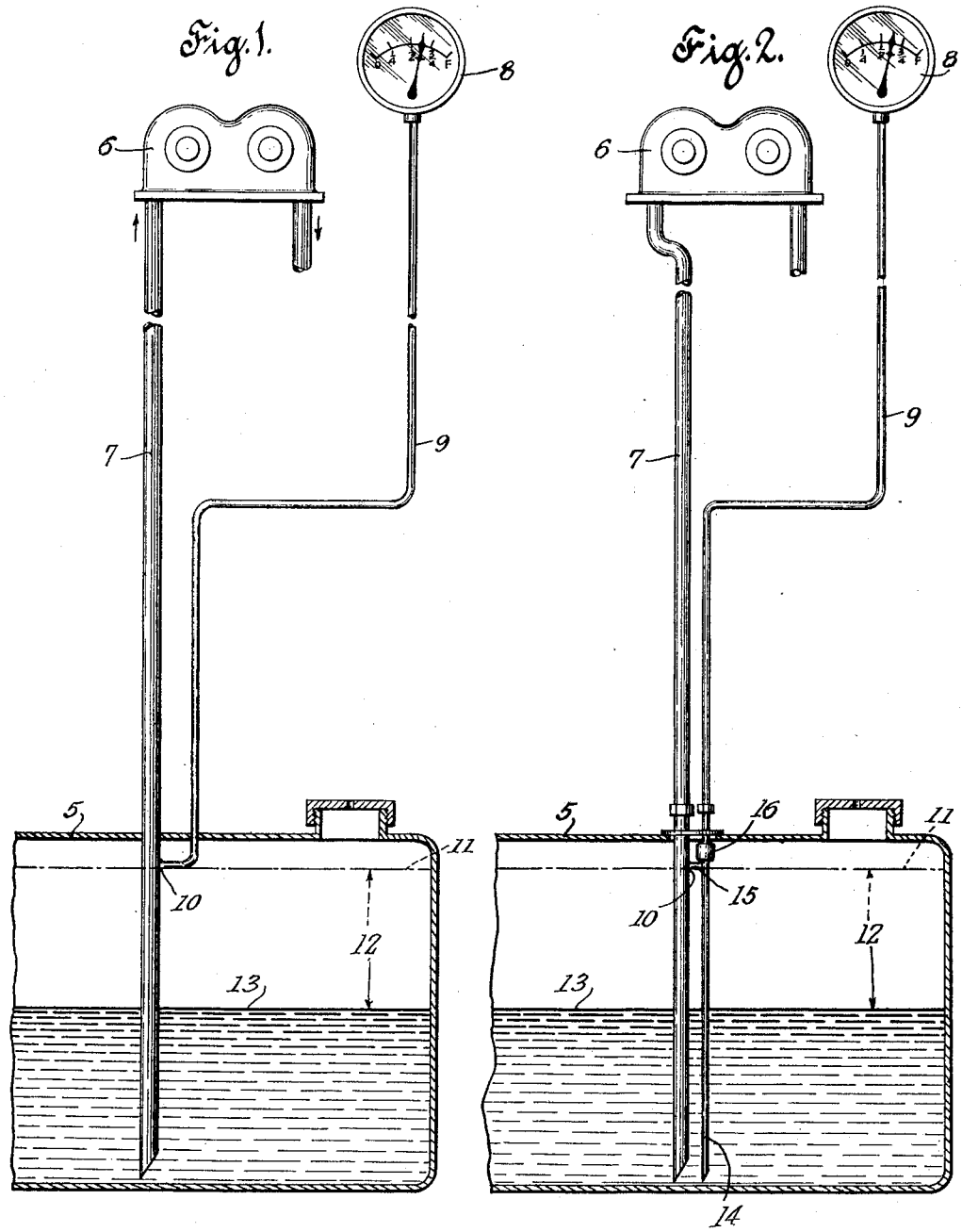

INVENTOR.
Curtis L. Howse
BY
Philip S. McLean ATTORNEY

Patented Apr. 25, 1933

1,905,172

UNITED STATES PATENT OFFICE

CURTIS L. HOWSE, OF DETROIT, MICHIGAN, ASSIGNOR, BY MESNE ASSIGNMENTS, TO A C SPARK PLUG COMPANY, OF FLINT, MICHIGAN, A CORPORATION OF MICHIGAN

LIQUID GAUGE

Application filed July 13, 1927. Serial No. 205,358.

This invention relates to the measurement of the height or quantity of liquid and particularly to the measurement of the gasoline and oil supplies in motor vehicles.

Special objects of the invention are to provide a simplified gauge organization which will function with those systems employing a continuously running pump for carrying the gasoline or oil from the storage chamber to the point of use; which will be self-rectifying in its operation, accurate, reliable and of simple, inexpensive construction, consisting of but few, sturdy parts and not liable to get out of order.

In addition to certain novel features of construction, combination and relation of parts, the invention involves as a new application of a known principle of operation, the measurement of the weight of that part of a liquid column between the maximum liquid level and the actual or existing liquid level and the reduction of this value to terms of height or liquid contents, as the case may be.

In the drawings accompanying and forming part of this specification, several simple practical embodiments and uses of the invention are disclosed, but as these are primarily by way of illustration, it will be understood that the structure and actual application of the invention may be varied without departure from the basic spirit and scope of the invention.

Figure 1 is a more or less diagrammatic illustration of a fundamental form of the invention applied to the measurement of the contents of a gasoline supply tank, for automobiles.

Figure 2 is a similar view illustrating developments of the basic idea to prevent pulsations of the pump affecting the reading of the gauge.

Figure 3:
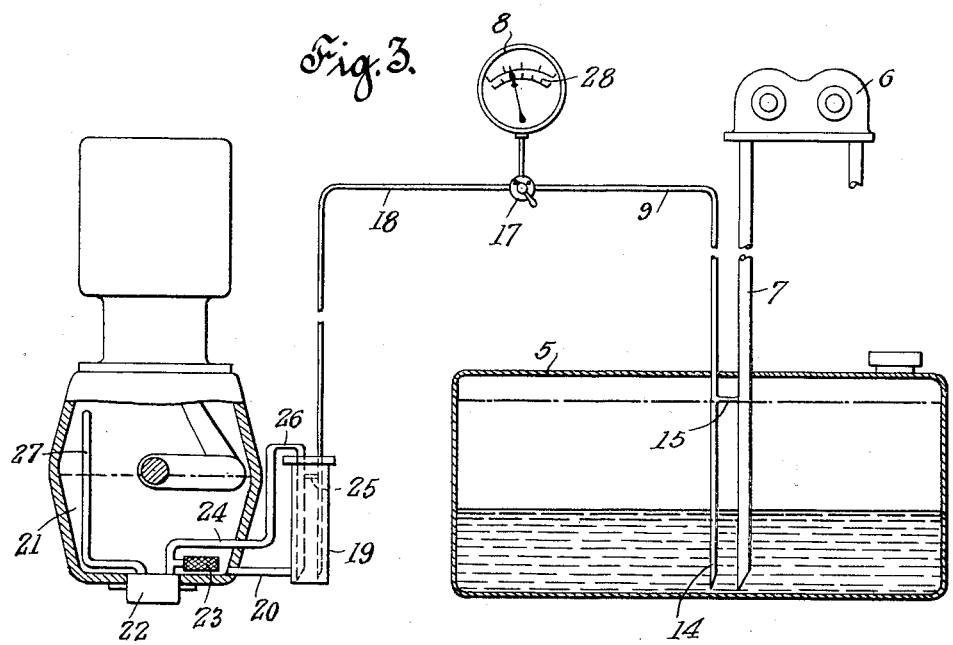
Figure 3 is a view illustrating an adaptation of the gauge for measurement of the crank case oil level as well as the measurement of the gasoline supply.

In Figure 1 a liquid fuel tank of ordinary form is indicated at 5 and a pump for transferring the fuel from the tank to the carburetor of the motor is indicated at 6, in communication with the contents of the tank by a suction line 7 extending down to a point near the bottom of the tank.

The gauge indicated at 8 is shown as of the diaphragm form, but differs from the gauges heretofore usually employed in that it is of the "vacuum" type, instead of the pressure type. From this gauge there extends a so-called "vacuum" line 9. This line, instead of dipping directly into the liquid contents of the tank, enters the liquid line through a constricted orifice, at a point 10 at a height substantially corresponding with the maximum liquid level 11 of the tank. As a consequence the gauge is subjected to the "pull" of that part 12 of the liquid column between the maximum liquid level 11 and the actual or existing liquid level 13. As the liquid is lowered in the tank by the action of the pump, the distance 12 builds up accordingly and the drag of this increased column of liquid manifests itself proportionately on the vacuum gauge.

The gauge being calibrated inversely as regards pressure, therefore shows either in units of volume or liquid level, as may be desired, the actual contents of the tank. The action of the pump automatically keeps the gauge registering properly and as such pumps hold the liquid column when the motor is stopped, the gauge will register properly, even after standing with the motor not in operation. If, however, there is any loss of vacuum after standing a considerable time, the pump will correct this as soon as it starts, for the first action of the pump is to withdraw air from the gauge line 9. Even if the tank is run "dry", to the extent of uncovering the mouth of the suction line 7, allowing air to enter gauge line 9, the pump will automatically correct this condition and bring the gauge to a proper reading on refilling the tank and as soon as the entering liquid covers the mouth of the suction tube.

In the embodiment of the invention illustrated in Figure 2, the vacuum line for the gauge is shown as a tube 14 extending all the way to the lowest level of the tank, separate from the pump line but connected with the pump line, as before, at substantially the maximum liquid level, but in this case by means of a branch 15 of restricted cross section. This restriction, as also in the construction of Figure 1, permits the pump to continue in operation if the gauge line leaks or even if the gauge is entirely disconnected. Also in this view, the vacuum tube is shown as having an expansion chamber 16 therein above the liquid level for preventing liquid from getting up into the line running into the gauge, which line ordinarily is a fine bore "hollow wire".

Figure 3 illustrates how a single gauge having a double scale 28 may be used to indicate either gasoline or oil supply by simply turning a valve 17 to connect the gauge through pipe 9 with the gasoline pumping system or through pipe 18 with the oil pumping system. Pipe 18 is shown entered in a well 19 connected at the bottom by a conduit 20 with the oil reservoir 21 in the crank case. The oil pump 22 is shown taking its main supply from the crank case through a screen 23 and as having a by-pass suction line 24 extending down into the well 19 and connected by a restricted way 25 with the oil vacuum line 18 substantially at the maximum oil level of the well and crank case. The oil suction line 24 is shown as restricted at 26 so that the main supply of oil will be taken from the crank case instead of being circulated through the well at the side of the crank case.

Figure 4:
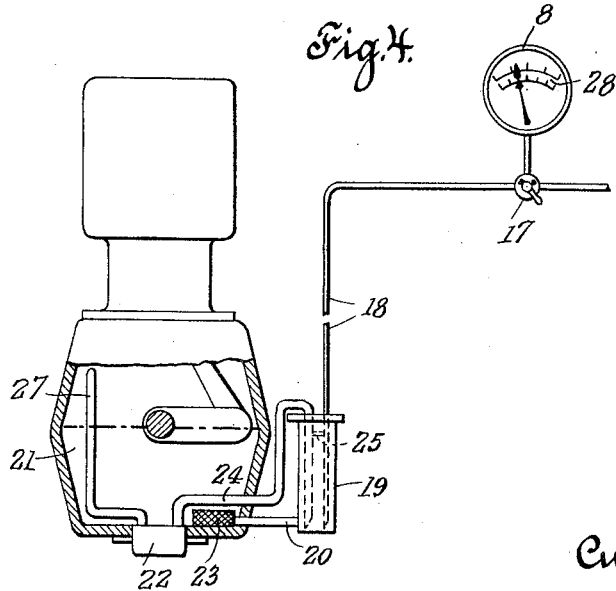
Figure 4 is a view illustrative of a modification of the oil measuring arrangement.

If desired, the entire oil supply may be drawn through the gauge well 19, as indicated in Figure 4, in which event the line 24 would be of full cross sectional size and the screen 23 would be connected with the well supply pipe 20. The pressure line of the pump is shown at 27 connected with the lubricating passage or passages of the engine.

The invention, it will be seen, utilizes the weight of a column of liquid between the upper datum or maximum liquid level and the actual or existing liquid level as a medium for actuating or effecting the actuation of a vacuum gauge, thus providing an accurate, reliable indication of the height or quantity of liquid in a tank or other holder. The graduations of the vacuum gauge may be varied to suit different requirements, it simply being necessary that the calibrations be such that the movable element of the gauge corresponds in its operation with the pull exerted by the measured column of the liquid.

The expansion chamber 16 is of particular importance when the tank is refilled from a nearly empty condition while the pump is at rest. Under these circumstances the increased hydrostatic pressure on the gauge line builds up pressure or at least reduces vacuum in this line. Liquid rising in this line will not go beyond this expansion chamber because of its much greater cross sectional area and this chamber therefore serves to "trap" any liquid rising in the vacuum line and prevents it from getting into the "hollow wire" leading to the gauge. This expansion chamber also obviates temporary error in the gauge reading which might otherwise exist before the pump operation could rectify the same.

It will be obvious that the form of the invention may be modified to suit the various requirements and uses to which the invention is put, all within the broad intent and scope of the following claims. In particular, it will be seen that the uses of the invention are manifold and that the device may be used for measuring the input as well as the withdrawal of liquid and that by changing the point of connection between the gauge line and liquid line, the datum level may be established wherever desired.

What is claimed is:

1. In apparatus of the character disclosed, a liquid containing tank, a gauge of the vacuum type having a vacuum line entered in said tank and open at its lower end to the liquid in the tank, a pump having a suction line entered in the tank and open at its lower end to the liquid in the tank, and a restricted communication connection between said vacuum line and suction line substantially at the maximum liquid level of the tank, said connection being sufficiently restricted to enable the pump to continue to function even though the gauge be disconnected or the vacuum line be broken, and to obviate the necessity for maintaining any fixed vertical distance between said tank and said gauge.

2. In apparatus of the character disclosed, a liquid containing tank, a gauge of the vacuum type having a vacuum line entered in said tank and open at its lower end to the liquid in the tank, a pump having a suction line entered in the tank and open at its lower end to the liquid in the tank, a restricted communication connection between said vacuum line and suction line substantially at the maximum liquid level of the tank, and an expansion chamber in said vacuum line above said connection, said connection being sufficiently restricted to enable the pump to continue to function even though the gauge be disconnected or the vacuum line be broken and to obviate the necessity for maintaining any fixed vertical distance between said tank and said gauge.

3. In apparatus of the character disclosed, a liquid containing tank, a gauge of the vacuum type, a pump having a suction line entered in said tank, a vacuum line extending from said gauge to the interior of said tank, said lines extending to the bottom of said tank, a restricted communication between the vacuum line and the suction line substantially at the maximum liquid level of the tank and being sufficiently restricted to enable the pump to continue to function even though the vacuum line be opened by disconnecting the gauge, and to obviate the necessity for maintaining any fixed vertical distance between said tank and said gauge.

4. In apparatus of the character disclosed, the combination with a pipe for transferring liquid from a tank, a vacuum line extending to the bottom of the tank and in communication with said pipe above the end of the same, a vacuum gauge connected with said vacuum line and calibrated to indicated liquid values relative to said point of connection with the pipe, a restricted communication between said vacuum line and said pipe at substantially the maximum liquid level in said tank, an expansion chamber in said vacuum line immediately above said communication, the restriction of said communication being so great as to permit the continued flow of liquid through the transfer pipe even though the vacuum line be broken or the vacuum gauge be disconnected, and said expansion chamber being located above the liquid level of the tank to prevent liquid getting into the vacuum line above the liquid level.

5. As a new article of manufacture, a tank unit for liquid gauges comprising a length of suction pipe extending to the bottom of the tank and having an open lower end for entry of liquid and a length of vacuum gauge pipe open at its bottom and extending to the bottom of the tank and having its lower end open at substantially the level of the lower open end of the suction pipe and connected with the length of suction pipe at substantially the maximum level of the liquid in the tank, the connection between the suction and vacuum pipes being so restricted as to enable the suction pipe to continue to function even though the vacuum pipe be opened at the top, and to obviate the necessity for maintaining any fixed vertical distance between said tank and said gauge.

6. As a new article of manufacture, a tank unit for liquid gauges comprising mechanically connected lengths of suction pipe and vacuum pipe, having open lower ends and in restricted communication at a point above such open lower ends, and the restriction being sufficient to enable continued functioning of the suction pipe even though the vacuum pipe be opened at the top.

In testimony whereof I affix my signature.

CURTIS L. HOWSE.

CERTIFICATE OF CORRECTION.

Patent No. 1,905,172.                                                April 25, 1933.

CURTIS L. HOWSE.

It is hereby certified that error appears in the printed specification of the above numbered patent requiring correction as follows: Page 3, lines 30 and 31, claim 5, strike out the words "extending to the bottom of the tank and", and lines 33 and 34, strike out the words "open at its bottom and extending to the bottom of the tank and"; and that the said Letters Patent should be read with these corrections therein that the same may conform to the record of the case in the Patent Office.

Signed and sealed this 30th day of May, A. D. 1933.

(Seal)                                                                    M. J. Moore.
                                                                               Acting Commissioner of Patents.